(12) United States Patent
Larsson et al.

(10) Patent No.: US 9,492,881 B2
(45) Date of Patent: Nov. 15, 2016

(54) DEVICE AND METHOD FOR POWDER HANDLING FOR WELDING APPARATUS

(75) Inventors: Rolf Gösta Larsson, Laxå (SE); Sievert Karl Gunnar Karlsson, Vintrosa (SE)

(73) Assignee: ESAB AB, Gothenburg (SE)

( * ) Notice: Subject to any disclaimer, the term of this patent is extended or adjusted under 35 U.S.C. 154(b) by 933 days.

(21) Appl. No.: 12/599,746

(22) PCT Filed: Apr. 30, 2008

(86) PCT No.: PCT/SE2008/050498
§ 371 (c)(1),
(2), (4) Date: Oct. 18, 2010

(87) PCT Pub. No.: WO2008/140397
PCT Pub. Date: Nov. 20, 2008

(65) Prior Publication Data
US 2011/0290763 A1    Dec. 1, 2011

(30) Foreign Application Priority Data

May 11, 2007 (SE) .................................. 0701145-5

(51) Int. Cl.
 *B23K 25/00* (2006.01)
 *B23K 9/18* (2006.01)
(52) U.S. Cl.
 CPC ...................................... *B23K 9/18* (2013.01)
(58) Field of Classification Search
 USPC ........ 219/73.2, 59.1, 74, 85.14, 85.15, 85.2, 219/85.22; 209/908, 910, 922, 933, 934
 See application file for complete search history.

(56) References Cited

U.S. PATENT DOCUMENTS

| | | | | |
|---|---|---|---|---|
| 2,191,471 A | * | 2/1940 | Hopkins | 219/73.21 |
| 2,767,302 A | * | 10/1956 | Brashear, Jr. | 219/137.51 |
| 3,735,087 A | * | 5/1973 | Arnoldy | 219/73 |
| 3,756,489 A | * | 9/1973 | Chartet | 228/43 |
| 3,898,415 A | * | 8/1975 | D'Acremont | 219/73 |
| 4,139,758 A | * | 2/1979 | Pinfold | 219/74 |
| 4,269,639 A | * | 5/1981 | Lewis | 156/54 |
| 4,943,086 A | * | 7/1990 | Cunningham | 280/741 |

(Continued)

FOREIGN PATENT DOCUMENTS

| | | |
|---|---|---|
| DE | 3005954 A1 | 8/1981 |
| DE | 3829596 A1 | 3/1990 |

(Continued)

OTHER PUBLICATIONS

International Search Report dated Feb. 9, 2008, in connection with PCT/SE2008/050498 filed Apr. 30, 2008.

*Primary Examiner* — David Angwin
*Assistant Examiner* — Amit K Singh

(57) ABSTRACT

A welding device and method for powder welding. The welding device includes at least a first container for fluxing agent in powder form, which first container includes an outlet with an outlet direction arranged for outflow of powder. The welding device further includes a first member for inlet of heated gas into the first container. The welding method includes arranging powder in the first container. Gas is heated and is allowed to pass into the first container for heating of the powder. The powder is then deposited on a welding area.

18 Claims, 5 Drawing Sheets

(56) References Cited

U.S. PATENT DOCUMENTS

| | | | |
|---|---|---|---|
| 5,021,149 A * | 6/1991 | Geisseler | 209/141 |
| 5,025,125 A * | 6/1991 | Peterson | 219/615 |
| 6,674,042 B1 * | 1/2004 | Walder et al. | 219/78.01 |

FOREIGN PATENT DOCUMENTS

| | | |
|---|---|---|
| JP | 8332571 | 12/1996 |
| WO | WO9929462 A2 | 6/1999 |

* cited by examiner

DEVICE AND METHOD FOR POWDER HANDLING FOR WELDING APPARATUS

TECHNICAL FIELD

The present invention relates to a device and a method for handling of powder for a welding apparatus for powder welding. Especially, the present invention relates to a device and a method for handling of powder which is to be supplied to a welding area in powder welding.

DESCRIPTION OF THE PRIOR ART

The present invention relates to powder welding which is a well known welding technique in which a fluxing agent in powder form is applied to a surface on which welding is to be performed. At least one welding electrode is brought to the surface where the powder has been applied and a voltage is applied between said at least one welding electrode and the surface. It is desirable that the entire welding area is covered by powder so that the welding may take place under powder within the entire welding area. In order to guarantee that the entire welding area is covered with powder, powder is applied so that it also extends on both sides of the welding area. Thus, during welding only a part of the powder will be consumed during the welding while the rest of the powder will remain unused on the surface. In order to minimize the powder use the unused powder is recycled by sucking up the unused powder after the welding has been performed and is mixed together with unused powder in a container from which container the powder is then brought to the surface on which welding is to be performed.

In the welding installations of today for powder welding, which are adapted for welding with high speed a lot of powder is consumed per time unit. However, the welding installations of today suffer from the heating of the powder which is to be brought to the welding area being uneven, that the mixture of old and new powder is uncontrolled and that it is hard to fill new powder.

In the German patent publication DE 3005954 A1 (DE) a device is described for recycling of powder in powder welding. According to DE only a third of the powder which has been arranged on the welding area is used while the remaining two thirds are brought back to a powder container for powder which is to be distributed on the welding area. The powder container has a compartment for used powder and a compartment for unused powder. The compartments are separated by a wall. In DE nothing is, however, mentioned on heating of powder before it is applied on the welding area.

SUMMARY OF THE INVENTION

An object of the present invention is to provide a welding device for powder welding and a method for handling of powder, which at least partly solves the problem with uneven or insufficient heating of the powder which is to be applied on the welding area.

At least one of these objects is fulfilled with a welding device and a method according to the appended independent claims.

Further advantages with the invention are achieved with the features in the dependent claims.

According to a first aspect of the invention a welding device is provided for powder welding, which welding device comprises a welding head for feeding of at least one welding electrode to a welding area, at least a first container for fluxing agent in powder form, which first container comprises an outlet with an outlet direction arranged for output of powder as well as an inlet for refill of powder, as well as a powder transport device for transport of powder from the outlet of the first container to the welding area. The welding device is characterized in that it comprises a first member for input of heated gas in the first container.

By arranging a first member for input of heated gas in the first container controlled heating of the powder is enabled. A suitable gas may then be brought into the first container through the first member. By controlling the temperature of the gas and the size of the gas flow through the first member the heating speed may be controlled.

With a welding device according to the invention heating of the powder before it is distributed on the welding area is provided. It is common that powder passes a pressure vessel before it is distributed in the welding area. In known welding devices the heating of the powder usually takes place in the pressure vessel. In a welding device according to the invention the heating with heated gas may be combined with such a heating in a pressure vessel which the powder passes after it has left the first container.

Said first member for input of heated gas may comprise at least one hole into the first container, through which hole the heated gas may flow into the first container. The hole may be placed on an arbitrary place in the first container, but it is preferably placed so that the heated gas may flow through as large portion as possible of the first container. Holes into the container are relatively simple and cheap to provide.

The first member for input of heated gas may comprise a plurality of holes into the first container. With a plurality of holes an even heating of the powder in the first container is easier to achieve.

If the first member for input of heated gas comprises a plurality of holes said plurality of holes may be arranged in the lower part of the first container. With such a placement of the holes an even heating of the powder is more easily achieved. The heated gas may with the described placement of the holes rise up through the first container.

The welding device may comprise a mixing device with at least one mixing chamber, wherein the outlet of the first container exits in at least one of said at least one mixing chambers in the mixing device, and wherein the member for input of heated gas is arranged for input of gas in the first chamber via at least one of said at least one mixing chambers and via the outlet of the first container. The mixing device enables an effective mixing of new and recycled powder.

Instead of the above described holes the first member may comprise a first set of pipes, comprising at least one pipe for heated gas, which first set of pipes is arranged to be in contact with the powder in the first container, wherein each one of said at least one pipe comprises holes through which the heated gas may leave the pipe and flow into the first container. With a set of pipes a more even heating of the powder in the first container is enabled as the pipes may extend into the middle of the container.

The first set of pipes may comprise a plurality of pipes. With a plurality of pipes in the first set of pipes it is easier to achieve an even heating of the powder in the first container compared with if the first set of pipes only comprises one pipe.

The first set of pipes for heated gas may be arranged at the outlet of the first container. By arranging the first set of pipes for heated gas at the outlet of the first container it is guaranteed that the heated gas flows through the main part of the powder in the first container.

The pipes in the first set of pipes may be essentially straight and comprise a length axis. Such pipes are easier and cheaper to manufacture than bent pipes.

The pipes in the first set of pipes may be arranged with their length axes essentially perpendicularly to the outlet direction of the first container. Such an alignment of the length axes of the pipes is favourable for heating of the powder in the container.

The holes in said at least one pipe in the first set of pipes has an outlet direction which may be arranged essentially perpendicularly to the outlet direction of the first container and perpendicularly to the length axis of said at least one pipe. Such an alignment of the length axes of the holes is favourable for heating of the powder in the container.

The welding device may comprise a second container for fluxing agent in powder form, which second container comprises an outlet with an outlet direction arranged for outflow of powder from the second container, and an inlet for refill of powder in the second container, wherein the first container is arranged for unused powder and the second container is arranged for used powder and wherein the powder transport device is arranged for transport of powder also from the outlet of the second container to the welding area. With such a welding device the recycling of powder, which has not been consumed during welding on the welding area, is enabled. Such used non consumed powder is then heated in the second container in the corresponding way as unused powder in the first container. With two containers recycling of powder as well as variation of the mixing relationship, through variation of the flow from the two different containers, is enabled.

The first member for input of heated gas may also be arranged for input of heated gas into the second container. With only one member for input of heated gas the cost for the welding device may be kept at a lower level compared to if two members are used.

The welding device may comprise a second member for input of heated gas into the second container. With separate members for input of heated gas into the first container and the second container the heating in the containers may be controlled independently.

The second member for input of heated gas may comprise at least one hole into the second container, through which hole the heated gas may flow into the second container. The hole may be placed on an arbitrary position in the second container but is advantageously placed so that the heated gas may flow through as large portion as possible of the second container. Holes into the container are relatively simple and cheap to provide.

The second member for input of heated gas may comprise a plurality of holes into the second container. With a plurality of holes an even heating of the powder in the first container is more easily achieved.

If the second member for input of heated gas comprises a plurality of holes said plurality of holes may be arranged in the lower part of the second container. With such a placement of the holes an even heating of the powder is more easily achieved. The heated gas may with the described placement of the holes rise up through the first container.

If the second member for input of heated gas comprises a plurality of holes said plurality of holes are arranged in the lower part of the second container.

As an alternative or complement to the above described holes the second member for input of heated gas may comprise a second set of pipes, comprising at least one pipe for heated gas, which second set of pipes is arranged to be in contact with the powder in the second container, wherein each one of said at least one pipe in the second set of pipes comprises holes through which the heated gas can leave said at least one pipe and flow into the second container for heating of the powder in the second container.

The second set of pipes may comprise a plurality of pipes. With a plurality of pipes in the second set of pipes it is easier to achieve an even heating of the powder in the second container compared with if the second set of pipes only comprises one pipe.

The second set of pipes for heated gas may be arranged at the outlet of the second container. By arranging the second set of pipes for heated gas at the outlet of the second container it is guaranteed that the heated gas flows through the main part of the powder in the second container.

The pipes in the second set of pipes may be essentially straight and comprise a length axis. Such pipes are easier and cheaper to manufacture than bent pipes.

The second set of pipes may be arranged with their length axes essentially perpendicularly to the outlet direction of the outlet of the second container. Such an alignment of the length axes of the pipes is favourable for heating of the powder in the container.

The holes in said at least one pipe in the second set of pipes may have an outlet direction which is arranged essentially perpendicularly to the outlet direction of the outlet of the second container and perpendicularly to the length axis of said at least one pipe. Such an arrangement of the outlet direction of the holes is favourable for heating of the powder in the second container.

The first container and the second container may be separated by a separating wall. It is also possible to have separate containers which have outer walls of their own, but by letting the first container and the second container be separated by a separating wall a compact welding device is achieved.

The size of the outlet for at least one of the first container and the second container may be varied in order to vary the relationship between used powder and unused powder on the welding area. This is favourable in that a good powder quality for the weld then may be guaranteed.

The separating wall may be movable so that the volume of the first container and the second container may be varied. This is favourable in that the volume of the containers then may be adapted to reflect the outlets from the first container and the second container.

The first set of pipes and the second set of pipes may be comprised by one and the same set of pipes. The pipes extend in this case firstly past one of the containers and then past the second container. In the case that the first set of pipes and the second set of pipes are comprised by separate sets of pipes the sets of pipes extend from a heating source to each one of the containers.

The welding device may comprise a recycling device which is arranged to collect unused powder from the welding area and to recycle it to the second container.

The welding device may comprise a heating source for heating of gas for at least one of the sets of pipes. Alternatively the heating source may be a separate unit which is separated from the welding device.

If the welding device comprises a mixing device the outlet of the second container may end in at least one of said at least one mixing chambers in the mixing device, wherein the second member for input of heated gas is arranged for input of gas into the second container via at least one of said at least one mixing chamber and via the outlet of the second container. With such an arrangement the risk for the member for input of heated gas to be clogged by powder may be minimized.

The mixing device may comprise a first set of mixing chambers and a second set of mixing chambers, wherein the first member for input of heated gas ends in the first set of mixing chambers and the second member for heated gas ends in the second set of mixing chambers. Such a mixing device guarantees a better mixing of new and recycled powder, at the same time as the heating of the powder in the first container may be controlled independently of the heating of the powder in the second container.

The mixing chambers in the first set of mixing chambers may be arranged interleaved with the mixing chambers in the second set of mixing chambers. Such an arrangement of the mixing chambers ensures a good mixing of new and recycled powder.

Each one of the mixing chambers may be arranged so that they extend below the first container as well as the second container. This enables an easier input of heated gas into the containers.

According to a second aspect of the present invention a method is provided for provision of heated fluxing agent in powder form on a welding area for powder welding, comprising the step to arrange the powder in the first container. The method is characterized by the steps of heating a gas, to bring the heated gas through the powder and to bring the heated powder from the first container to the welding area.

In the following preferred embodiments of the invention will be described with reference to the appended drawings.

SHORT DESCRIPTION OF THE DRAWINGS

Figure 1:
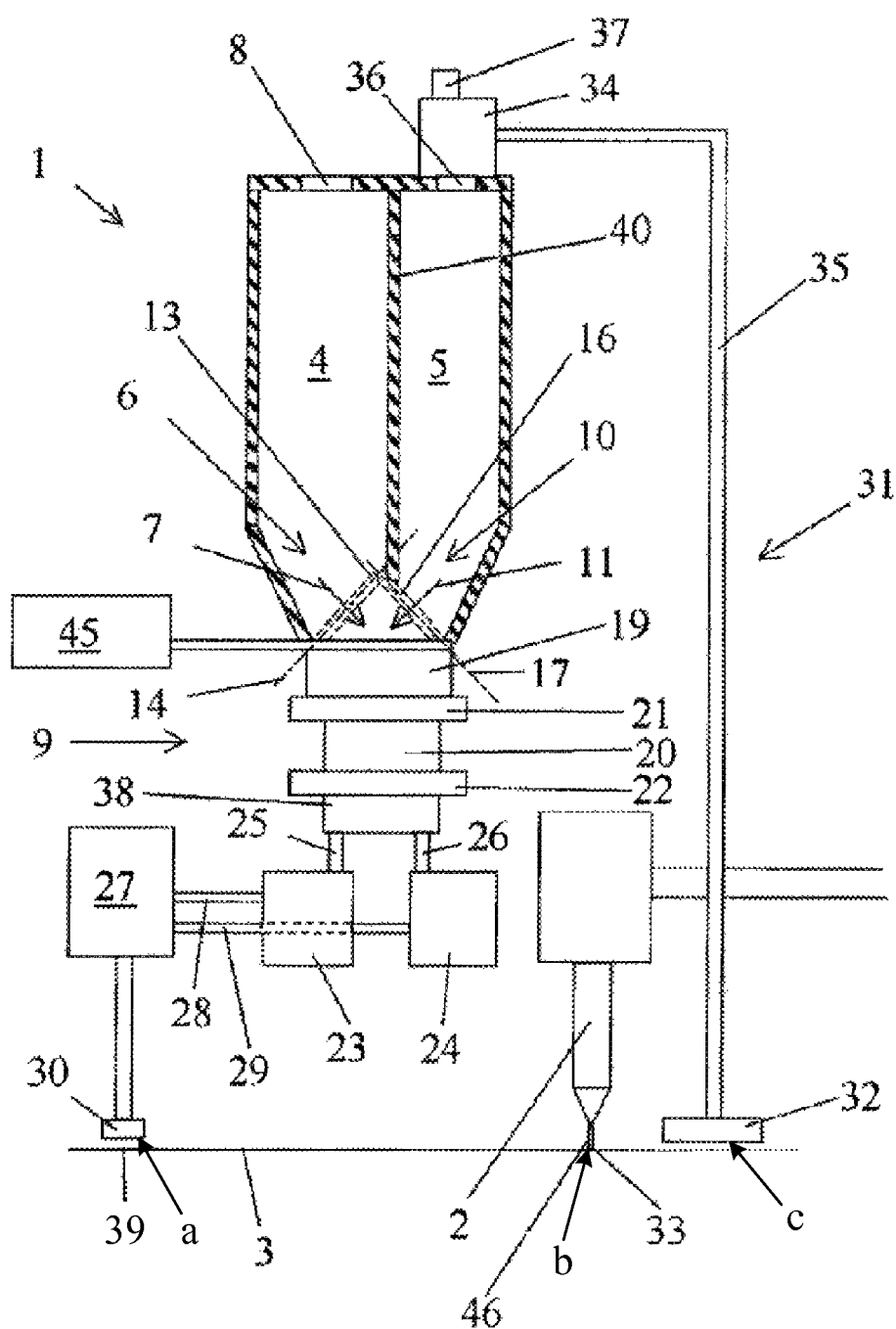
FIG. 1 shows schematically a welding device according to an embodiment of the present invention, which welding device comprises a first container and a second container for fluxing agent in powder form.

DESCRIPTION OF PREFERRED
EMBODIMENTS OF THE INVENTION

In the following description of preferred embodiments of the invention similar parts in different figures will be denoted by the same reference numeral.

FIG. 1 shows schematically a welding device 1 according to an embodiment of the present invention. The welding device 1 comprises a welding head 2 for feeding of one or more welding electrodes 46 to a welding point 33 on a welding area 3. The welding device 1 comprises a first container 4 and a second container 5 for fluxing agent in powder form. The first container 4 is designed for unused fluxing agent while the second container 5 is designed for used fluxing agent. The first container 4 comprises an outlet 6 with an outlet direction 7, arranged for outflow of powder, as well as an inlet 8 for refill of powder. The welding device comprises also a powder transport device 9 for transport of powder from the outlet 6 of the first container 4 to the welding area 3. The second container 5 comprises an outlet 10, with an outlet direction 11, arranged for outflow of powder as well as an inlet 36 for refilling of powder. The powder transport device 9 is arranged also for transport of powder from the outlet 10 of the second container 5 to the welding area 3. The welding device comprises a first member for inlet of heated gas into the first container in the form of a first set of pipes 13, which in the shown embodiment is a plurality of pipes 47 with parallel length axes 14, of which length axes 14 only one is shown in FIG. 1. The pipes are arranged to be in contact with the powder in the first container 4 and are arranged with their length axes 14 essentially parallel to the outlet direction 7 of the outlet 6 of the first container. The first set of pipes 13 are designed for heated gas and each one of the pipes 47 comprises holes 15 through which the heated gas may leave the pipes and flow into the first container 4 for heating of the powder in the first container 4. The welding device comprises also a second member for inlet of heated gas into the second container in the form of a second set of pipes 16, which in the shown embodiment is a plurality of pipes 48 with parallel length axes 17, of which length axes 17 only one is shown in FIG. 1. The pipes 48 in the second set of pipes 16 are arranged to be in contact with the powder in the second container 5 and are arranged with their length axes 17 essentially parallel to the outlet direction 11 of the outlet 10 of the second container 5. The second set of pipes 16 is designed for heated gas and each one of the pipes 48 comprises holes 18 through which the heated gas may leave the pipes and flow into the second container 5 for heating of powder in the second container 5. The welding device comprises a heating source 45 which is connected to the first set of pipes 13 and to the second set of pipes 16 for heating of gas for the first set of pipes 13 and the second set of pipes 16.

The powder transport device 9 comprises a mixing chamber 19 in which the outlet 6 of the first container 4 and outlet 10 of the second container 5 ends. The powder transport device 9 further comprises a dosation chamber 20, an upper throttle valve 21 and a lower throttle valve 22. The dosation chamber 20 is connected to a first pressure vessel 23 and a second pressure vessel 24, by means of a first pipe 25 and a second pipe 26, respectively, via a guidance device 38 which is arranged to guide powder either to the first pressure vessel 23 or the second pressure vessel 24. The powder transport device 9 further comprises a distribution container 27 which is connected to the first pressure vessel 23 and the second pressure vessel 24 by means of a third pipe 28 and a fourth pipe 29, respectively. A distribution nozzle 30 is connected to the distribution container 27 for distribution of powder on the welding area 3. The first pressure vessel 23 and the second pressure vessel 24 are pressurized in order to be able to transport powder from the pressure vessels 23, 24 using the pressure.

The welding device 1 also comprises a collection device 31 which comprises a collection nozzle 32 for collection of powder from the welding area 3 after the welding point 33. The collection nozzle 32 is connected to a separator with a fan 34 by means of a fifth pipe 35. The separator with the fan 34 comprises a powder outlet 36 which is arranged connected to the second container 5, in order to bring powder from the separator 34 to the second container 5, and an air outlet 37 through which air is brought out from the separator 34.

During operation of the welding device 1 according to the invention fluxing agent in powder form is filled into the first container 4. Earlier used fluxing agent in powder form is arranged in the second container 5. The heat source 45 produces hot gas which is led through the first set of pipes 13 and the second set of pipes 16 and further through the holes 15 in the pipes 47 in the first set of pipes 13 and holes 18 in the pipes 48 in the second set of pipes, into the first container 4 and the second container 5, respectively, for heating of the powder in said containers. Powder may pass from the first container 4 as well as the second container 5 into the mixing chamber 19 in which new powder and used powder is mixed. When the upper throttle valve 21 is opened the mixed powder may leave the mixing chamber 19 and be brought into the dosation chamber 20. When the dosation chamber 20 is full the upper throttle valve 21 is closed and the lower throttle valve 22 is opened so that the powder may leave the dosation chamber and be led into the first pressure vessel 23 via the guidance device 38 through the third pipe 28 until the first pressure vessel 23 is full. At the same time the second pressure vessel 24 is pressurized so that the powder may be brought under pressure from the second pressure vessel 24 to the distribution container 27. When the first pressure vessel 23 is full or when the second pressure vessel starts to be empty, the control device 38 closes the connection to the first pressure vessel and opens the connection to the second pressure vessel 24 so that the second pressure vessel 24 may be filled through the fourth pipe 29. At the same time pressurized air is coupled to the first pressurized vessel 23 so that the powder may be brought to the distribution container 27. From the distribution chamber 27 the powder is then allowed to fall down through the distribution nozzle 30 to the welding area 3. Thus, powder is brought to the distribution chamber 27 alternately from the first pressure vessel 23 and the second pressure vessel 24.

The welding device is arranged so that the welding head 2, the nozzle 30 and the collection nozzle 32 are still in relation to each other and so that the welding head 2, the distribution nozzle 30 and the collection nozzle 32 are movable in relation to the welding area 3, wherein the distribution nozzle 30 is followed by the welding head 2 which is followed by the collection nozzle. After the powder has been applied on a point 39 in position a on the welding area 3 by means of the distribution nozzle 30 the welding head 2, the distribution nozzle 30 and the collection nozzle 32 is moved in relation to the point 39 so that the welding head 2 arrives at the point 39 in the position b, wherein welding takes place in the point 39 by means of the voltage which is applied between the welding head and the welding area 3. After the welding in point 39 the welding head 2, the distribution nozzle 30 and the collection nozzle 32 are moved in relation to point 39 so that the collection nozzle 32 is situated above point 39 in position c, wherein the powder which has not been consumed during the welding is sucked up by means of the collection nozzle 32 to the separator 34 where the used powder is brought to the second container 5.

Figure 2:
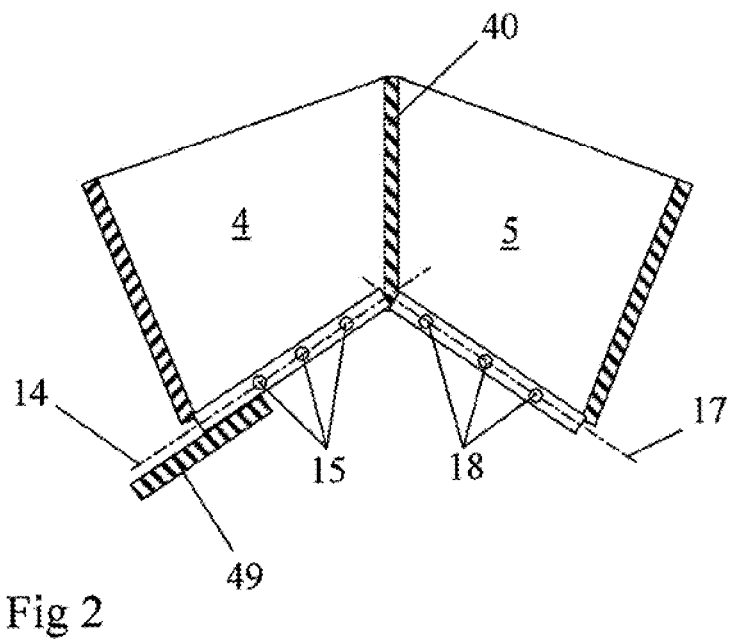
FIG. 2 shows in larger detail, partly in cross-section, a part of the first container and the second container.

FIG. 2 shows in larger detail the first container 4 and the second container 5. The first container 4 and the second container 5 are separated by a movable separating wall 40. The outlet 6 of the first container 4 and the outlet 10 of the second container 5 may independently be adjustable in size, wherein the outlet speed from the first container 4 and the second container 5 thereby may be adjusted. The mixing relationship between powder from the first container 4 and from the second container 5 may thereby be controlled, i.e. the mixing relationship between new powder and old powder. In the figure a movable hatch 49 is also shown which may be used to vary the size of the outlet 6 from the first container 4.

Figure 3:
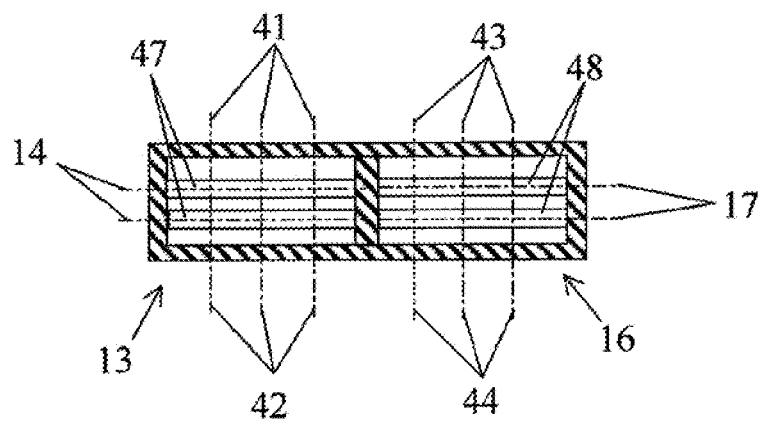
FIG. 3 shows in a view from above a part of the first container and the second container.

FIG. 3 shows in a view from above a part of the first container and the second container with two pipes 47 in the first set of pipes 13 and two pipes 48 in the second set of pipes 16. The holes 15 in the pipes in the first set of pipes 13 have outlet directions 41, 42, which are directed essentially perpendicularly to the outlet direction 7 of the first container 4 and essentially perpendicularly to the length axis 14 of the pipes in the first set of pipes 13. The holes 18 in the pipes in the second set of pipes 16 have outlet directions 43, 44, which are directed essentially perpendicularly to the outlet direction 11 of the second container 4 and essentially perpendicularly to the length axes 17 of the pipes in the second set of pipes 16.

Figure 4:
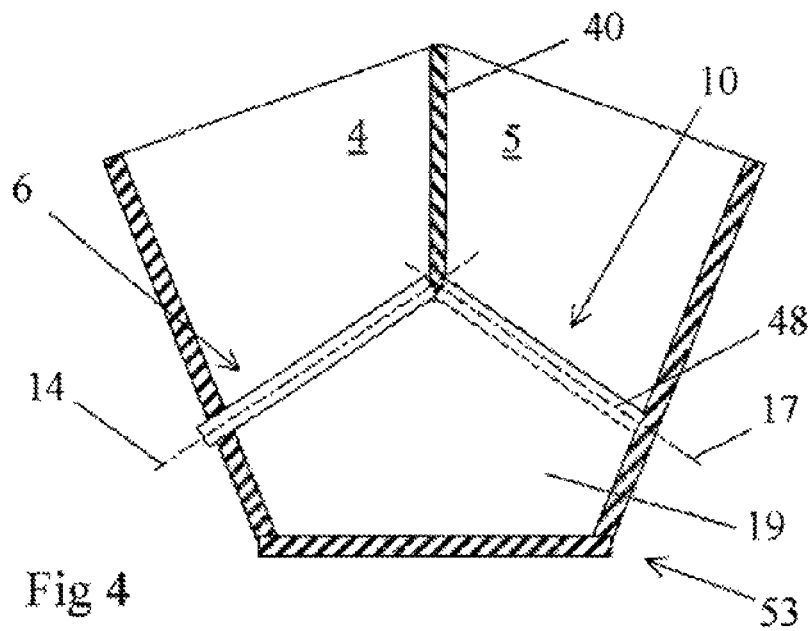
FIG. 4 shows in larger detail a part of a first container and a second container according to an alternative embodiment of the present invention.
Figure 5:
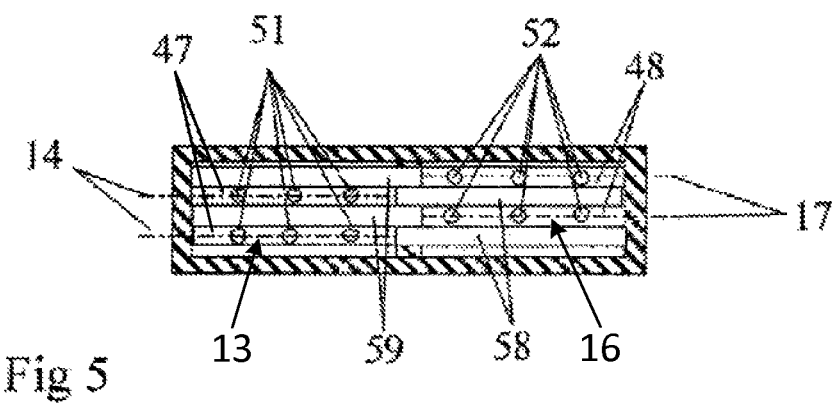
FIG. 5 shows schematically in a view from below a part of the first container and the second container.
Figure 6:
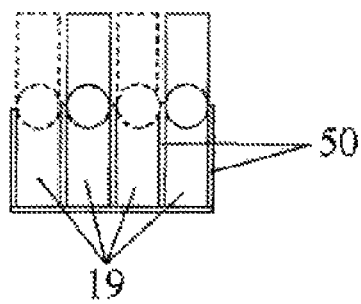
FIG. 6 shows schematically in a view from the side mixing chambers which are arranged below the first chamber and the second chamber.

FIG. 4 shows in larger detail a part of a first container 4 and a second container 5. FIG. 5 shows schematically in a view from below a part of the first container 4 and the second container 5. FIG. 6 shows schematically in a view from the side a mixing device 53 which is arranged below the first container 4 and the second container 5. The containers 4, 5, and the member for input of heated gas into the containers 4, 5, which are shown in FIG. 4-6 may replace the containers 4, 5 and the member for input of heated gas into the containers in a welding device according to the embodiment in FIG. 1. With reference to FIG. 4-6 the first container 4 and the second container 5 are separated by a movable separating wall 40. The outlet 6 of the first container 4 and the outlet 10 of the second container 5 may independently be adjustable in size, wherein the outlet speed from the first container 4 and the second container 5 may be adjusted. Thereby, the mixing relationship between powder from the first container 4 and powder from the second container 5 may be adjusted, i.e. the mixing relationship between new powder and old powder may be adjusted. In the embodiment which is shown in FIG. 4 the mixing device 53 is divided into a plurality of mixing chambers 19 which are divided by walls 50 (FIG. 6). A first set of pipes 13 (FIG. 5) comprises a plurality of pipes 47 with length axes 14 while a second set of pipes 16 comprises a plurality of pipes 48 with length axes 17. The pipes 47 in the first set of pipes 13 comprises holes 51 on the lower side of the pipes 47. The pipes 48 in the second set of pipes 16 comprises holes 52 on the lower side of the pipes 48. Each pipe 47, 48, is via the holes 51, 52, connected to a corresponding mixing chamber 19. There is thus arranged a mixing chamber 19 to each pipe 47, 48. The mixing chambers 19 are arranged interleaved with each other and each mixing chamber 19 extends over both the outlet 6 of the first container 4 as well as the outlet 10 of the second container 5. Thanks to the mixing chambers 19 being interleaved with each other and that only one pipe 47, 48, is connected to each mixing chamber 19 the upper side on one of the halves of each mixing chamber will be occupied by an opening between two pipes and will thereby comprise a part of the outlet from one of the containers 4, 5. The mixing chambers which are connected to the first set of pipes 13 comprises a first set of mixing chambers 58 while the mixing chambers which are connected to the second set of pipes 16 comprises a second set of mixing chambers 59.

During operation of a welding device comprising a first container 4 and a second container 5 according to the embodiment in FIG. 4-6 heated gas will be brought into the pipes 47, 48, and be guided into the corresponding mixing chambers 19 via the holes 51, 52. From the mixing chambers 19 the heated gas is then led into one of the containers 4, 5, where the heated gas heats the powder. Thanks to the described placement of the pipes, the mixing chambers 19 and the outlets the risk for the holes 51, 52, being clogged by powder is minimized.

Figure 7:
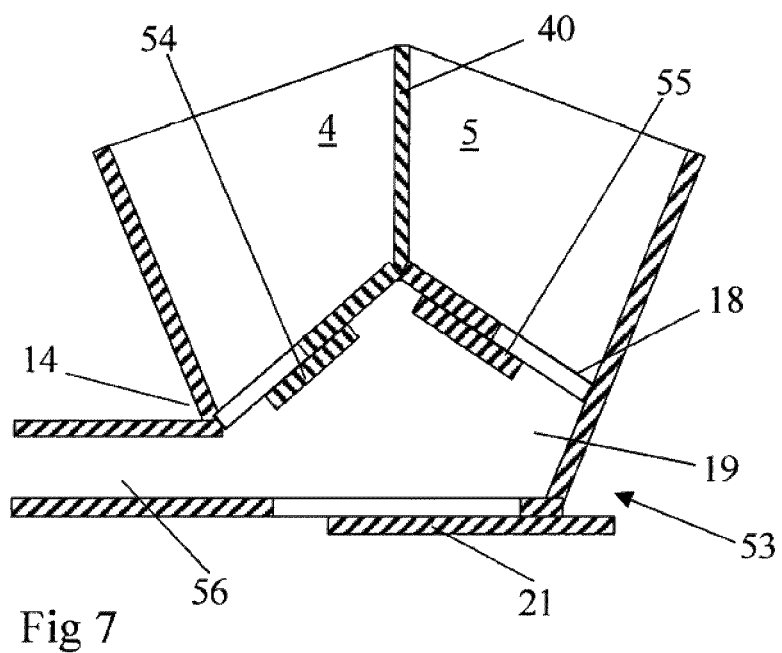
FIG. 7 shows schematically in a view from the side a part of the first container and the second container according to an alternative embodiment of the present invention.
Figure 8:
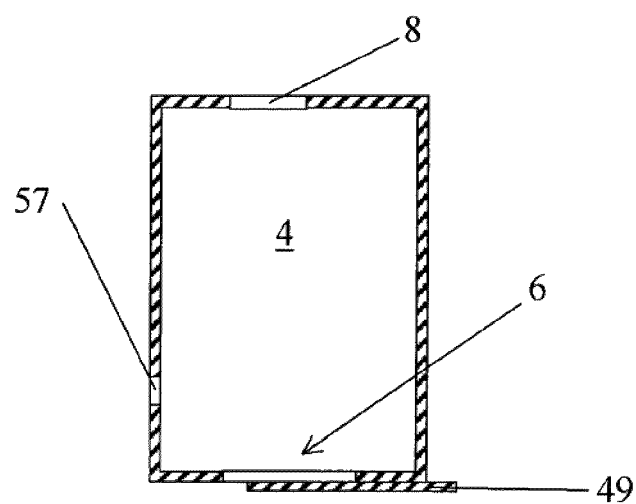
FIG. 8 shows in a view from the side a first container with a first member for input of heated gas into the first container according to an embodiment of the invention.

FIG. 7 shows schematically in a view from the side a part of a first container 4 and a second container 5 according to an alternative embodiment of the present invention. The container which is shown in FIG. 8 may replace the containers and the member for input of heated gas into the containers in a welding device according to the embodiment of FIG. 1. The size of the outlet 6 from the first container 4 may be varied by means of a first movable hatch 54, while the size of the outlet 10 from the second container 5 may be varied by means of a second movable hatch 55. The outlet 6, 10 from the containers 4, 5, ends in a mixing device 53 with one common mixing chamber 19. A first member for input of heated gas into the containers 4, 5, is comprised of an inflow pipe 56 which is connected to the mixing chamber 19. In FIG. 7 is also shown the upper throttle valve 21, which may be used to let powder out from the mixing chamber 19.

During operation of a welding device 1 comprising a first container 4, a second container 5 and a member for supply of heated gas in accordance with the embodiment in FIG. 7, heated gas is brought into the mixing chamber 19 via the inflow pipe 56. The heated gas will then leave the mixing chamber 19 and be brought into the containers 4, 5, via the outlets 6, 10, from the containers 4, 5. The heated gas then heats the powder in the containers 4, 5.

FIG. 8 shows in a view from the side a first container 4 with a first member for inlet of heated gas into the first container 4 according to an alternative embodiment of the invention. The container that is shown in FIG. 8 may replace the containers and the member for inlet of heated gas into the containers in a welding device according to the embodiment in FIG. 1. In the embodiment which is shown in FIG. 8 the member for inlet of heated gas is comprised by a hole 57 in the lower part of the container 4. The size of the outlet 6 from the first container 4 may be varied by means of a movable hatch 49. The first container 4 comprises also an inlet 8 for refilling of powder.

During operation of a welding device according to the embodiment which is shown in FIG. 8 heated gas is brought into the first container 4 via the hole 57 and heats the powder in the first container.

It is not necessary that the heated gas is arranged to flow into the container in which new of used powder is refilled. It is possible within the scope of the invention to arrange the welding device so that the first container is comprised by any other container than the one in which new or used powder is refilled. In order to illustrate this a welding device according to an alternative embodiment is shown schematically in FIG. 9. Only the differences between the welding device in FIG. 1 and the welding device in FIG. 9 will be described. The welding device comprises a powder transport device 9 which comprises a first chamber 60 in the form of a mixing chamber.

The welding device 1 comprises a second container 61 and a third container 62 for fluxing agent in powder form. The second container 61 is designed for unused fluxing agent while the third container 62 is designed for used fluxing agent. The second container 61 comprises an outlet 6, with an outlet direction 7, arranged for outflow of powder, as well as an inlet 8 for refilling of powder. The third container 62 comprises an outlet 10, with an outlet direction 11, arranged for outflow of powder as well as an inlet 36 for refilling of powder. The powder transport device 9 is arranged also for transport of powder from the outlet 6 of the second container 61 to the welding area 3 as well as from the outlet 10 of the third container 62 to the welding area 3. The welding device comprises a first member for inlet of heated gas into the first container 60 in the form of a hole 63 in the first container 60. The heating source 45 is connected to the hole 63 by means of a heating pipe 64.

Figure 9:
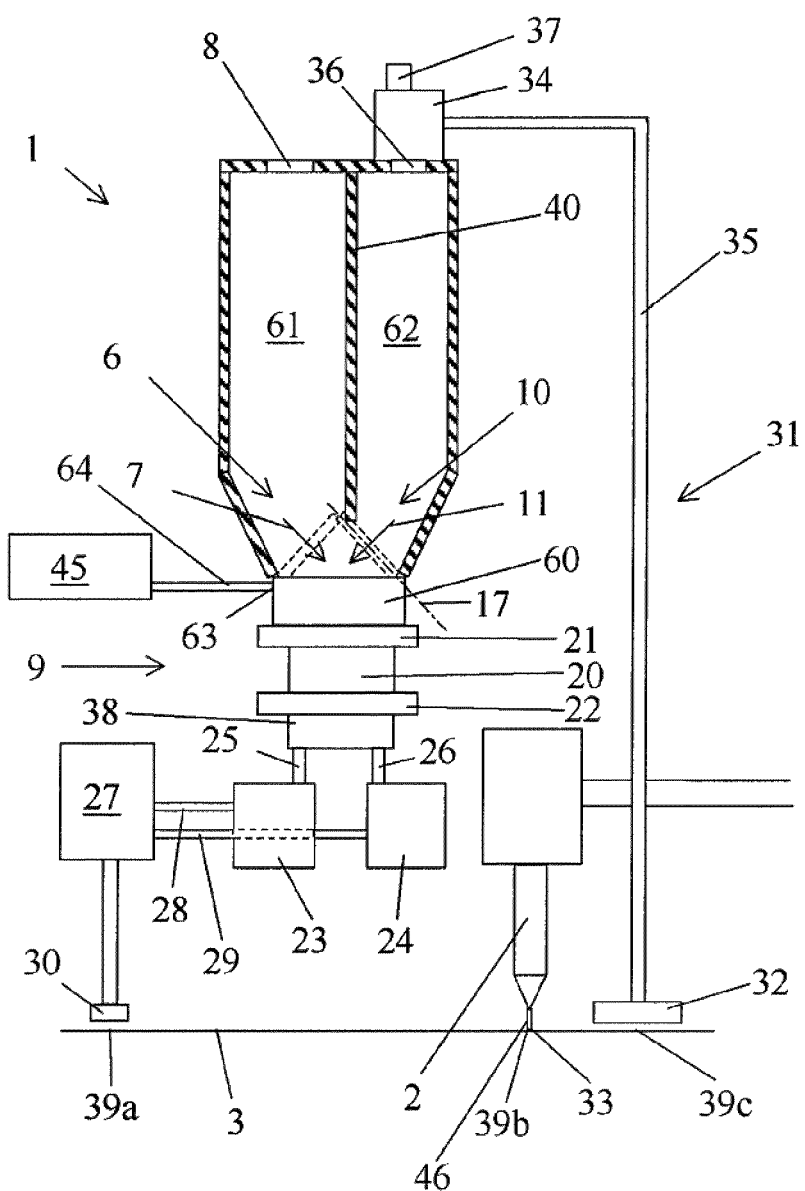
FIG. 9 shows schematically a welding device according to an alternative embodiment of the present invention.

The operation of a welding device 1 according to the embodiment which is shown in FIG. 9 is performed in the corresponding way as has been described in connection with FIG. 1. Heated gas will be brought into the first chamber 60 from the heating source by means of the heating pipe 64.

The described embodiments may be varied in many ways without departing from the spirit and scope of the invention which is limited only by the appended claims.

It is possible within the frame of the invention to have a heating source for each one of the first set of pipes 13 and the second set of pipes 16.

In the description above it has been described that a first container is intended for new powder and a second container is intended for reused powder. Within the frame of the invention it may, however, also be two different kinds of powder in the containers.

The invention claimed is:

1. A welding device for powder welding, comprising a welding head for feeding of at least one welding electrode to a welding area, at least a first container for fluxing agent in powder form, which first container comprises an outlet with an outlet direction arranged for outflow of powder and an inlet for refilling of powder, and a powder transport device for transport of powder from the outlet of the first container to the welding area, the welding device further comprising a first member for inlet of heated gas into the first container, the first member including a first plurality of pipes each transporting the heated gas into the first container and arranged with a length axis oriented substantially perpendicular to the outlet direction of the first container, a second container for fluxing agent in powder form, which second container comprises an outlet with an outlet direction arranged for outflow of powder from the second container, an inlet for refilling of powder into the second container, wherein the first container is arranged for unused powder and the second container is arranged for used powder and wherein the powder transport device is arranged for transport of powder also from the outlet of the second container to the welding area, a second member for inlet of heated gas into the second container, the second member including a second plurality of pipes each transporting the heated gas into the second container and arranged with a length axis oriented substantially perpendicular to the outlet direction of the second container wherein the outlet of the second container is disposed in at least one mixing chamber in a mixing device, and wherein the second member for inlet of heated gas is arranged for inlet of gas into the second chamber via at least one of said at least one mixing chamber and via the outlet of the second container, wherein the first plurality of pipes of the first member includes a plurality of holes formed through one or more sidewalls of the first plurality of pipes for inlet of heated gas into the first container, and the second plurality of pipes of the second member includes a plurality of holes formed through one or more sidewalls of the second plurality of pipes for inlet of heated gas into the second container.

2. A welding device according to claim 1, wherein the first set of pipes is in contact with the powder in the first container.

3. A welding device according to claim 2, wherein the first set of pipes for heated gas is arranged at the outlet of the first container.

4. A welding device according to claim 2, wherein the second set of pipes is in contact with the powder in the second container.

5. A welding device according to claim 4, wherein the second set of pipes for heated gas is arranged at the outlet of the second container.

6. A welding device according to claim 1, wherein the separating wall is movable so that a volume of the first container and a volume of the second container are variable.

7. A welding device according to claim 1, wherein the size of the outlets for at least one of the first container and the second container can be varied to vary the relationship between used powder and unused powder on the welding area.

8. A welding device according to claim 1, comprising a collection device which is arranged to collect unused powder from the welding area and return it to the second container.

9. A welding device according to claim 2, comprising a heating source for providing the heated gas to at least one of: the first plurality of pipes, and the second plurality of pipes.

10. A welding device for powder welding, comprising a welding head for feeding of at least one welding electrode to a welding area, at least a first container for fluxing agent in powder form, and a powder transport device for transport of powder from an outlet of the first container to the welding area, the welding device further comprising a first member for inlet of heated gas into the first container, the first member including a first plurality of pipes transporting the heated gas into the first container and each arranged with a length axis oriented substantially perpendicular to the outlet direction of the first container, a second container for fluxing agent in powder form, wherein the first container is arranged for unused powder and the second container is arranged for used powder and wherein the powder transport device is arranged for transport of powder also from an outlet of the second container to the welding area, a second member for inlet of heated gas into the second container, the second member including a second plurality of pipes each transporting the heated gas into the second container and arranged with a length axis oriented substantially perpendicular to the outlet direction of the second container, wherein the outlet of the second container ends in at least one mixing chamber in a mixing device, and wherein the second member for inlet of heated gas is arranged for inlet of gas into the second chamber via at least one of said at least one mixing chamber and via the outlet of the second container, and wherein the first plurality of pipes of the first member includes a first plurality of holes formed through one or more sidewalls for inlet of heated gas into the first container, each of the first plurality of holes having an outlet direction arranged substantially perpendicular to the outlet direction of the first container and substantially perpendicular to the length axis of the first plurality of pipes, and the second plurality of pipes of the second member includes a second plurality of holes formed through one or more sidewalls for inlet of heated gas into the second container, each of the second plurality of holes having an outlet direction arranged substantially perpendicular to the outlet direction of the second container and substantially perpendicular to the length axis of the second plurality of pipes.

11. A welding device according to claim 10, the first plurality of pipes is exposed to an interior of the first container.

12. A welding device according to claim 11, wherein the first plurality of pipes for heated gas is arranged at the outlet of the first container.

13. A welding device according to claim 11, wherein the second plurality of pipes is exposed to an interior of the second container.

14. A welding device according to claim 13, wherein the second plurality of pipes for heated gas is arranged at the outlet of the second container.

15. A welding device according to claim 10, wherein the separating wall is movable so that a volume of the first container and a volume of the second container are variable.

16. A welding device according to claim 10, wherein the size of the outlets for at least one of the first container and the second container can be varied to vary the relationship between used powder and unused powder on the welding area.

17. A welding device according to claim 10, comprising a collection device which is arranged to collect unused powder from the welding area and return it to the second container.

18. A welding device according to claim 11, comprising a heating source for providing the heated gas to at least one of: the first plurality of pipes, and the second plurality of pipes.

* * * * *